G. H. White.
Fruit Basket.
Nº 109,983. Patented Dec. 6, 1870.
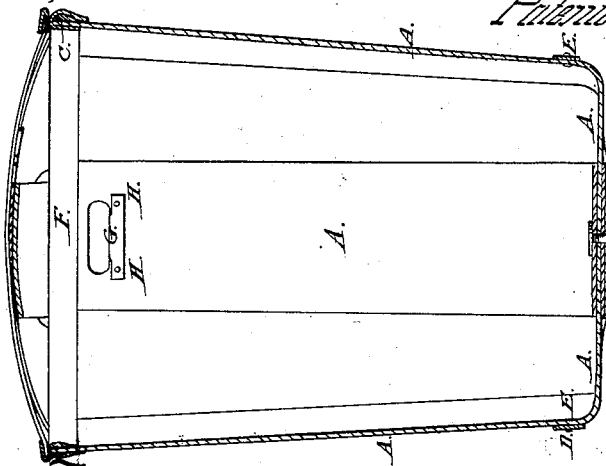
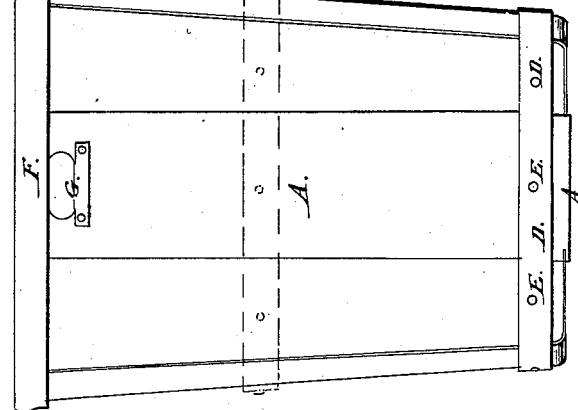
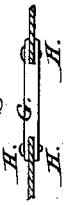
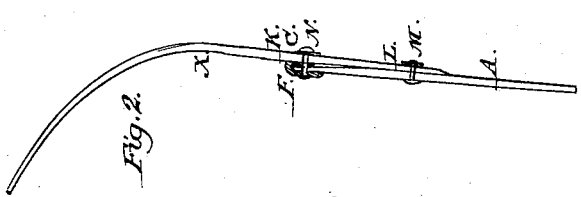
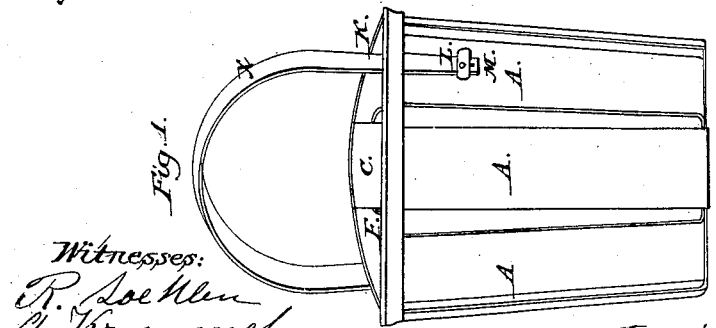
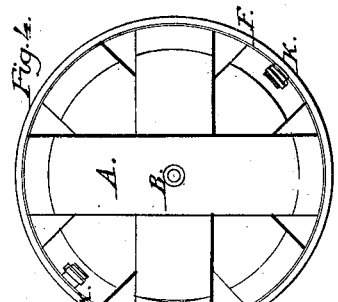
Witnesses:
R. Loehlen
A. Krummel
Inventor: Geo. H. White
N. PETERS, PHOTO-LITHOGRAPHER, WASHINGTON, D.C.

UNITED STATES PATENT OFFICE.

GEORGE H. WHITE, OF HUNTINGTON, NEW YORK.

IMPROVEMENT IN FRUIT-BASKETS.

Specification forming part of Letters Patent No. 109,983, dated December 6, 1870; antedated November 26, 1870.

*To all whom it may concern:*

Be it known that I, GEORGE H. WHITE, of Huntington, in the county of Suffolk and State of New York, have made certain new and useful improvements, producing a new article of manufacture in Vegetable and Fruit Baskets; and I do hereby declare that the following is a full, clear, and exact description of the same, reference being had to the accompanying drawings, making part of this specification, in which—

Figure 1 represents an outside view of the basket with my improvements as used for a berry-basket; Fig. 2, a detached vertical section; and Fig. 3, a detached horizontal section, displaying the manner of securing the handle to the sides of the basket. Fig. 4 is an inverted plan of the same basket. Fig. 5 is an outside view of the basket in the form used for carrying large fruit or as a vegetable-basket. Fig. 6 is a vertical central section of the same. Figs. 7 and 8 show a detached vertical horizontal section, showing the manner of the hand-holes in the basket.

Similar letters of reference indicate corresponding parts in the several figures.

The object of this invention is to produce a basket which is durable and strong, and one that can be produced at a less cost than those now made.

A represents the usual vertical strips which pass across and form the bottom as well as the sides of the basket. Of these strips I employ a sufficient number to inclose the circumference. I arrange them centrally across the bottom, one below the other, of the proper length to obtain the proper height of the basket. I now fasten all these strips together by a single central rivet, B, and bend the strips over a pattern-block, which is made according to the diameter of the desired basket. I then obtain a small wooden hoop, C, which I glue or otherwise secure at the upper ends of the strips, by means whereof they are held together and assume the sought-for circular shape.

For a vegetable-basket I also pass a hoop, D, around its lower part, and secure it to each strip by rivets E, as shown in Figs. 5 and 6.

In large baskets one or more additional hoops are employed between the top and bottom hoops to add to the strength of the basket; and in order to cover the basket I use a wooden cover, which is provided with a metal rim, 1, on its periphery.

I give additional security and strength to the upper hoop by binding the top edge of the basket with a tin or other metal band, F, which is previously swaged V-shaped, so as to pass over the hoop C of the top edge and over the inner edge top of the basket. After adjusting this metal band I swage it down tightly, so as to close, bind, and clamp the ends of the strips. The flange F produces a strong and smooth view on the top edge of the basket.

For vegetable-baskets I cut in two opposite strips immediately below the band F proper apertures for hand-holes, of which the lower edge I protect by means of a metal binding, G, passing over the lower edge in said apertures, and the binding is made with lips H H, extending a short distance on each side of the apertures, which lips are riveted together and through the strip, secures it to the strip, all clearly shown in Figs. 6, 7, and 8.

In making small baskets, such as are used for berries, the strips are sufficiently narrow to leave a space between them for the proper ventilation of the fruit. In small baskets for common use a bow-handle, X, is necessary to facilitate the carrying of the same instead of the hand-holes.

I provide the metal band F with an opening, K, on the opposite sides, through its top edge, through which I pass the ends of the handle a distance below the metal band F, and secure its ends upon the respective strips by means of a metal cross-clip, L, which has pointed ends, that I force through the strip, and clinch them in the inside of the strip, and by using a central rivet, M, through the strip, the end of the handle, and the center of the cross-clip L, and also by means of a rivet, N, through the band F and the handle, it is very firmly secured to the sides of the basket.

From the foregoing it will be observed that baskets constructed in the manner therein set forth are sufficiently durable for ordinary use, while the material constituting the same can be obtained at a small cost, and persons of the smallest capacities can easily make them. Thus the expense of producing them is so slight that they can be manufactured and sold at a price far below anything that has hitherto been produced or known.

Having fully described my invention, I claim as an article of manufacture—

The basket made of strips A, strengthened at top by the wooden hoop C, and bound over the top and hoop by the metal strip F, as described.

GEO. H. WHITE.

Witnesses:
R. BOCKLEN,
A. KRIMMEL.